United States Patent
Norder et al.

(10) Patent No.: US 10,459,620 B2
(45) Date of Patent: Oct. 29, 2019

(54) CAPTION RATE CONTROL

(71) Applicant: NEDELCO, INC., Aurora, NE (US)

(72) Inventors: Ross C. Norder, Aurora, NE (US);
Kyle James Ehlers, Aurora, NE (US)

(73) Assignee: NEDELCO, INC., Aurora, NE (US)

( * ) Notice: Subject to any disclaimer, the term of this patent is extended or adjusted under 35 U.S.C. 154(b) by 0 days.

(21) Appl. No.: 15/893,243

(22) Filed: Feb. 9, 2018

(65) Prior Publication Data
US 2019/0250803 A1  Aug. 15, 2019

(51) Int. Cl.
*G06F 3/0484* (2013.01)
*G10L 15/26* (2006.01)
*G06F 3/0481* (2013.01)
*H04L 29/08* (2006.01)

(52) U.S. Cl.
CPC ...... *G06F 3/04847* (2013.01); *G06F 3/04817* (2013.01); *G10L 15/265* (2013.01); *H04L 67/141* (2013.01)

(58) Field of Classification Search
CPC ............. G06F 3/04847; G06F 3/04817; G10L 15/265; H04L 67/141
See application file for complete search history.

(56) References Cited

U.S. PATENT DOCUMENTS

| | | | | |
|---|---|---|---|---|
| 5,056,629 A * | 10/1991 | Tsuji | ............... | B66B 3/00 187/396 |
| 5,147,205 A * | 9/1992 | Gross | ............... | G09B 7/04 345/581 |
| 6,409,513 B1 * | 6/2002 | Kawamura | ............... | G09B 17/04 434/178 |
| 8,707,349 B2 * | 4/2014 | Gilson | ............... | H04N 21/234381 725/32 |
| 2001/0005825 A1 * | 6/2001 | Engelke | ............... | H04M 3/42391 704/235 |
| 2002/0122136 A1 * | 9/2002 | Safadi | ............... | H04N 5/445 348/465 |
| 2004/0152054 A1 * | 8/2004 | Gleissner | ............... | G09B 5/06 434/156 |
| 2005/0219219 A1 * | 10/2005 | Momosaki | ............... | G06F 16/34 345/169 |
| 2007/0091208 A1 * | 4/2007 | Kim | ............... | H04N 5/44513 348/565 |
| 2007/0300281 A1 * | 12/2007 | Lee | ............... | H04N 5/44 725/135 |
| 2008/0095442 A1 * | 4/2008 | Ekin | ............... | G06K 9/325 382/187 |
| 2008/0163093 A1 * | 7/2008 | Lorido | ............... | G01C 23/00 715/771 |
| 2008/0292272 A1 * | 11/2008 | Yamazaki | ............... | H04N 5/44513 386/244 |
| 2009/0237422 A1 * | 9/2009 | Modi | ............... | G06F 3/0485 345/685 |

(Continued)

*Primary Examiner* — Andrea N Long
(74) *Attorney, Agent, or Firm* — Foley & Lardner LLP; Paul S. Hunter

(57) ABSTRACT

Disclosed are a method, a system, and a non-transitory computer readable medium for presenting captions. A caption rate control interface may be displayed on a touch display device. A user input to adjust a caption rate is received through the caption rate control interface, and the caption rate is adjusted according to the user input. A caption is displayed according to the adjusted caption rate.

19 Claims, 13 Drawing Sheets

(56) References Cited

U.S. PATENT DOCUMENTS

| | | | |
|---|---|---|---|
| 2011/0019088 A1* | 1/2011 | Kase | H04N 5/44513 348/468 |
| 2011/0213607 A1* | 9/2011 | Onishi | H04N 7/147 704/2 |
| 2011/0214088 A1* | 9/2011 | Sandru | G09G 5/346 715/785 |
| 2012/0033948 A1* | 2/2012 | Rodriguez | G11B 27/34 386/282 |
| 2012/0173235 A1* | 7/2012 | Mountain | G10L 15/26 704/235 |
| 2012/0176540 A1* | 7/2012 | Labrozzi | H04N 21/4312 348/468 |
| 2012/0301111 A1* | 11/2012 | Cordova | H04N 9/8205 386/245 |
| 2016/0062970 A1* | 3/2016 | Sadkin | G06F 17/212 715/233 |
| 2016/0133298 A1* | 5/2016 | Zhou | G11B 27/28 386/248 |
| 2016/0203818 A1* | 7/2016 | Cha | G10L 15/26 704/235 |
| 2017/0206914 A1* | 7/2017 | Engelke | G10L 15/06 |
| 2017/0303052 A1* | 10/2017 | Kakareka | G01S 3/86 |
| 2018/0197575 A1* | 7/2018 | Doherty | G06Q 30/0241 |
| 2018/0211556 A1* | 7/2018 | Sreedhara | G09B 17/04 |

\* cited by examiner

CAPTION RATE CONTROL

BACKGROUND

The following description is provided to assist the understanding of the reader. None of the information provided is admitted to be prior art.

Captions allow people with hearing difficulties to view dialogues in a text form. Captions may be presented on a display in blocks of words, where each block includes one or more words. For example, two or more words in a first block are simultaneously presented, and subsequently additional words in a second block are simultaneously presented. Each block may be presented at a corresponding time of the dialogue, such that the viewer can follow the dialogue without hearing the sound. However, some people may have difficulties reading or understanding the captions when multiple words in a group are presented simultaneously together.

Figure 1:
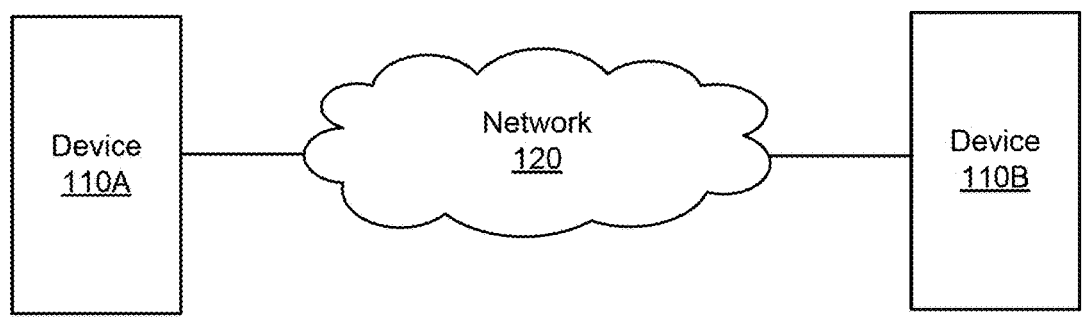
FIG. 1 is a block diagram of a computing environment according to an example embodiment.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Various embodiments disclosed herein are related to a method, a system, and a non-transitory computer readable medium for presenting captions with an adjustable caption rate. A caption herein refers to any text or symbols to visually represent a dialogue. A caption may be presented in blocks of words. A caption rate is referred to the rate (or speed) of presenting characters of words in a block. In one aspect, a caption rate is indicative of a time period after displaying a character within a block and before displaying a subsequent character within the block. A time period after presenting a first character and before presenting a second character in a block is adjustable to change the rate of presenting the first character and the second character. For example, increasing a time period between two characters displayed decreases the caption rate, and decreasing a time period between two characters displayed increases the caption rate. Accordingly, a user may adjust the caption rate by adjusting a time period between characters displayed to improve readability of captions presented.

In some embodiments, a caption rate control interface may be displayed on a touch display device. A user input to adjust a caption rate is received through the caption rate control interface, and the caption rate is adjusted according to the user input. Thus, caption can be displayed at the adjusted caption rate as the user input.

Referring to FIG. 1, illustrated is a block diagram of a computing environment 100 according to an example embodiment. In some embodiments, the computing environment 100 includes devices 110A, 110B and a network 120. The devices 110A, 110B can be any computing devices communicating over the network 120. Examples of computing devices include a phone with a display screen, a smartphone, a desktop, a tablet PC, server computer, etc.

The network 120 is a hardware component, through which the devices 110 can communicate. The network 120 is implemented as a wired network, a wireless network, or a combination of them. Examples of the wired network include a network based on Ethernet, USB, RS232, etc. Examples of the wireless network include a cellular network, a satellite network, 1G, 2G, 3G, 4G, 60 GHz communication network, WiFi, Bluetooth, near field communication, etc.

In one example configuration, a live call session between the devices 110A and 110B can be established, and a caption indicating a dialogue of the live call is displayed on the device 110B. The device 110A may detect audio including a voice of a user operating the device 110A and generate an audio data electrically representing the audio. The device 110A may detect a dialogue from the audio data, and generate a caption data electrically representing the dialogue in the audio. The device 110A may transmit the caption data to the device 110B through the network 120. In some embodiments, the device 110A forwards the audio data to the device 110B through the network 120, and the device 110B generates a caption data electrically representing the dialogue in the audio. Based on the caption data, the device 110B renders a visual representation of the caption.

In one aspect, the device 110B generates a user interface to adjust a caption rate for changing a rate of the caption displayed, and presents the user interface to a user operating the device 110B. The device 110B receives, through the user interface, a user input to adjust the caption rate, and renders the visual representation of the caption according to the caption rate specified by the user input. Hence, a user of the device 110B suffering from hearing difficulties may adjust the caption rate to better understand the dialogue in the live call with the user of the device 110A.

In other embodiments, the device 110A may be a video source generating a video data electrically representing a video, and the device 110B may be a display device for visually presenting the video according to the video data. The device 110B may also generate a caption data according to dialogue in the video, or receive the caption data from the device 110A. Alternatively, the device 110A transmits the caption data to the device 110B. According to the caption data, the device 110B may visually present the caption according to the dialogue in the video. The device 110B may also present a user interface to adjust the caption rate, and display the caption according to the adjusted caption rate. Hence, a user of the device 110B suffering from hearing difficulties may adjust the caption rate to better understand or interpret the dialogue in the video.

Figure 2:
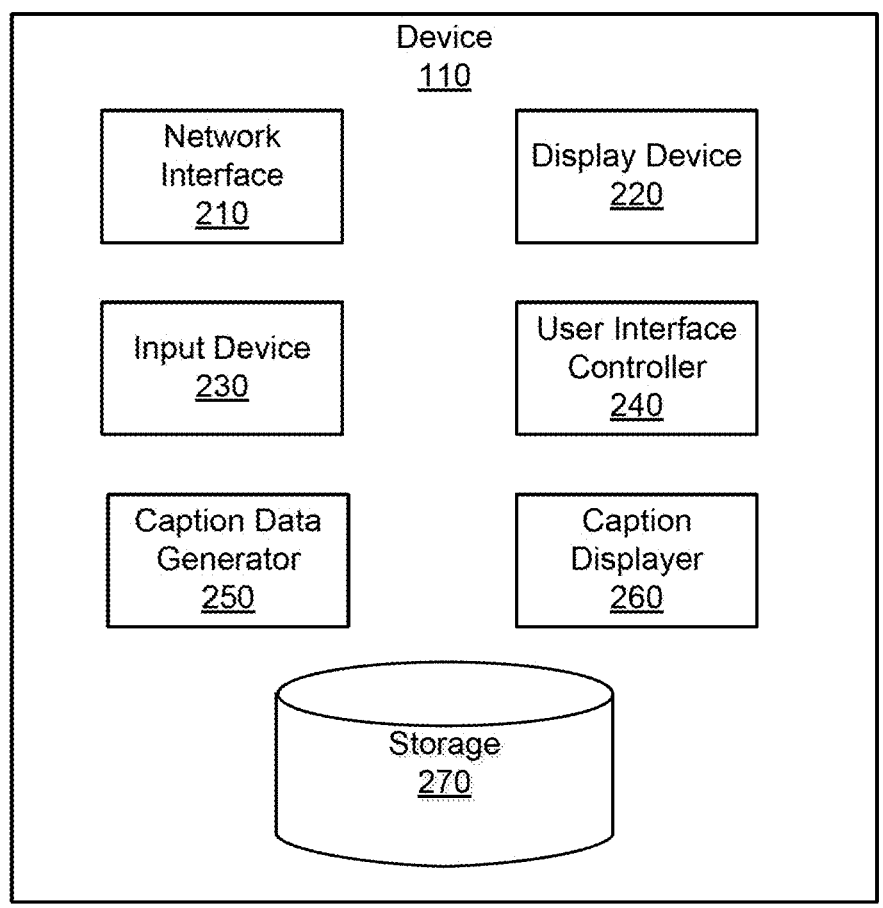
FIG. 2 is a block diagram of a device for presenting caption according to an example embodiment.

Referring to FIG. 2, illustrated is a block diagram of a device 110 for presenting captions according to an example embodiment. In some embodiments, the device 110 includes a network interface 210, a display device 220, an input device 230, a user interface controller 240, a caption data generator 250, a caption displayer 260, and storage 270. These components may be embodied as hardware, software, or a combination thereof. These components operate together to present a user interface to adjust a caption rate and present captions according to the adjusted caption rate. In other embodiments, the device 110 includes more, fewer, or different components than shown in FIG. 2.

The network interface 210 is a component coupled to the network 120. The network interface 210 communicates with a network interface 210 of another device. For example, the network interface 210 receives an audio data electrically representing an audio to be reproduced, a video data electrically representing a video to be reproduced or a combination of them through the network 120. For another example, the network interface 210 receives a caption data electrically representing the dialogue in a text form.

The display device 220 is a component that renders a visual representation. The display device 220 may display one or more images according to the video data. Examples of the display device 220 include plasma display panel (PDP), a liquid crystal display (LCD), an organic light emitting diode (OLED) display, a projector, or a cathode ray tube (CRT), or any combination of them.

The input device 230 is a component that receives a user input. Examples of the user input include executing an application, establishing a call session with another device, displaying one or more images, rendering an audio representation, displaying captions, adjusting a setting for displaying captions, etc. For example, a font color, a font size, or a caption rate of captions displayed may be adjusted according to the user input. The input device 230 may be implemented as a pointing device (e.g., a mouse), a keyboard, a keypad, a touch pad, etc. to receive the user input. In some embodiments, the input device 230 and the display device 220 are implemented as a touch display panel that displays images and senses a user touch or a user interaction associated with a user input.

The user interface controller 240 is a component that generates a user interface. In one aspect, the user interface controller 240 generates a user interface to allow a user to adjust a setting for displaying captions, and presents the user interface through the display device 220. The user interface controller 240 may also receive the user input to adjust the setting for displaying captions through the input device 230. In one approach, the user interface controller 240 generates a slider control interface to allow easy control of the setting for displaying captions. In one implementation, the slider control interface includes a repositionable slider on a track, where a position of the slider on the track indicates a corresponding setting for displaying captions. For example, the device 110 is a smartphone employing a touch display device to receive a user input through a user touch. The user may easily reposition the slider along the track through a simple touch operation on the smartphone to change the setting for displaying captions. Detailed examples of the slider control interface are provided below with respect to FIGS. 4 through 5.

The caption data generator 250 is a component that generates a caption data electrically representing captions to be displayed. In one approach, the caption data generator 250 receives an audio data electrically representing an audio, and detects a human voice from the audio. Moreover, the caption data generator 250 detects a dialogue associated with the human voice, and generates a caption data electrically representing captions of the dialogue. In one aspect, captions include multiple blocks of words, where each block of words is associated with a corresponding time of the dialogue. The caption data generator 250 may also generate block indicators each indicating a beginning of a corresponding block and an associated timing. For example, a block indicator is represented as a "^" character, and is added at a beginning of a block in the caption data. The block indicators may not be displayed by the display device 220, but used by the device 110 (e.g., the caption displayer 260) to indicate timings to display beginnings of blocks of words.

The caption displayer 260 is a component that renders a visual representation of captions indicated by the caption data. The caption displayer 260 may obtain settings for displaying captions, and cause the display device 220 to display captions. In one approach, the caption displayer 260 detects a block indicator from the caption data, and causes a first character of a first word in the block to be displayed at a corresponding time indicated by the caption data. Moreover, the caption displayer 260 causes captions to be displayed by the display device 220 according to the caption rate specified by the setting for displaying captions. For example, the caption displayer 260 obtains a character hold time period from the caption data. The character hold time period indicates a time period after displaying a character in a block and before displaying a subsequent character in the block. The caption displayer 260 causes the display device 220 to display a character in a block to be presented the character hold time period after presenting a preceding character. By adjusting the character hold time, the caption rate of captions presented by the display device 220 can be adjusted.

The storage 270 is a component that stores data within the device 110. The storage 270 may be a non-transitory computer readable medium. The storage 270 may store instructions when executed by a processor (not shown) of the device 110 cause the processor to execute various functionalities disclosed herein. The storage 270 may store metadata, etc. In some embodiments, the storage 270 also stores audio data, video data, metadata, etc. The storage 270 may also store caption data including captions, block identifiers, and setting for displaying captions (e.g., font color, font size, a caption rate, character hold time period, etc.). The storage 270 allows components within the device 110 such as the network interface 210, display device 220, input device 230, user interface controller 240, caption data generator 250, caption displayer 260 to access stored data.

Figure 3:
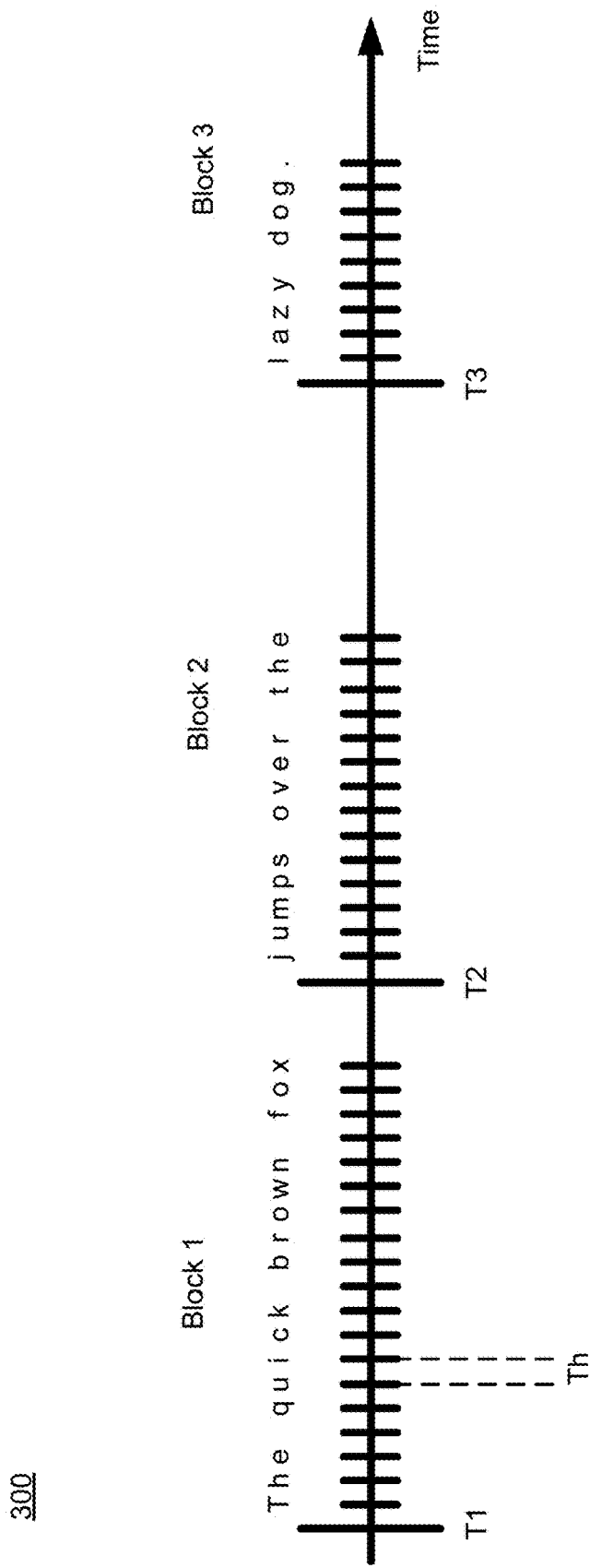
FIG. 3 is an example timing diagram of caption displayed according to an example embodiment.

Referring to FIG. 3, illustrated is an example timing diagram 300 of caption displayed according to an example embodiment. Assuming for an example that captions include a first block "The quick brown fox," a second block "jumps over the," and "lazy dog." The captions may be a dialogue from a live call, a video, an audio, etc. In one aspect, block identifiers (e.g., "^") are added to indicate beginnings of each of the blocks, but may not be displayed.

In one approach, the caption displayer 260 receives the first block, and detects a block identifier of the first block. The caption displayer 260 may retrieve the text "The quick brown fox" of the first block with a block identifier (e.g., "^") in the beginning of the first block and a character hold time period Th from the storage 270. The caption displayer 260 sequentially presents the text "The quick brown fox" of the first block, where the first character of the first block may be presented in response to the block identifier at time T1, and each character other than the first character of the first block is presented the character hold time period Th after presenting a preceding character. After presenting the last character of the first block, the caption displayer 260 waits to receive a second block of words.

The caption displayer 260 may repeat the similar procedure for displaying the second block of words. In particular, the caption displayer 260 may retrieve text "jumps over the" of the second block with a block identifier (e.g., "^") in the beginning of the second block and a character hold time period Th from the storage 270. The caption displayer 260 sequentially presents the text "jumps over the" of the second block, where the first character of the second block may be presented in response to the block identifier at time T2, and each character other than the first character of the second block is presented the character hold time period Th after presenting a preceding character. After presenting the last character of the second block, the caption displayer 260 waits to receive a third block of words.

The caption displayer 260 may repeat the similar procedure for displaying the third block of words. In particular, the caption displayer 260 may retrieve text "lazy dog." of the third block with a block identifier (e.g., "^") in the beginning of the third block, and a character hold time period Th. The caption displayer 260 sequentially presents the text "lazy dog." of the third block, where the first character of the third block may be presented in response to the block identifier at time T3, and each character other than the first character of the third block is presented the character hold time period Th after presenting a preceding character. After presenting the last character of the third block, the caption displayer 260 waits to receive an additional block of words.

Figure 4A:
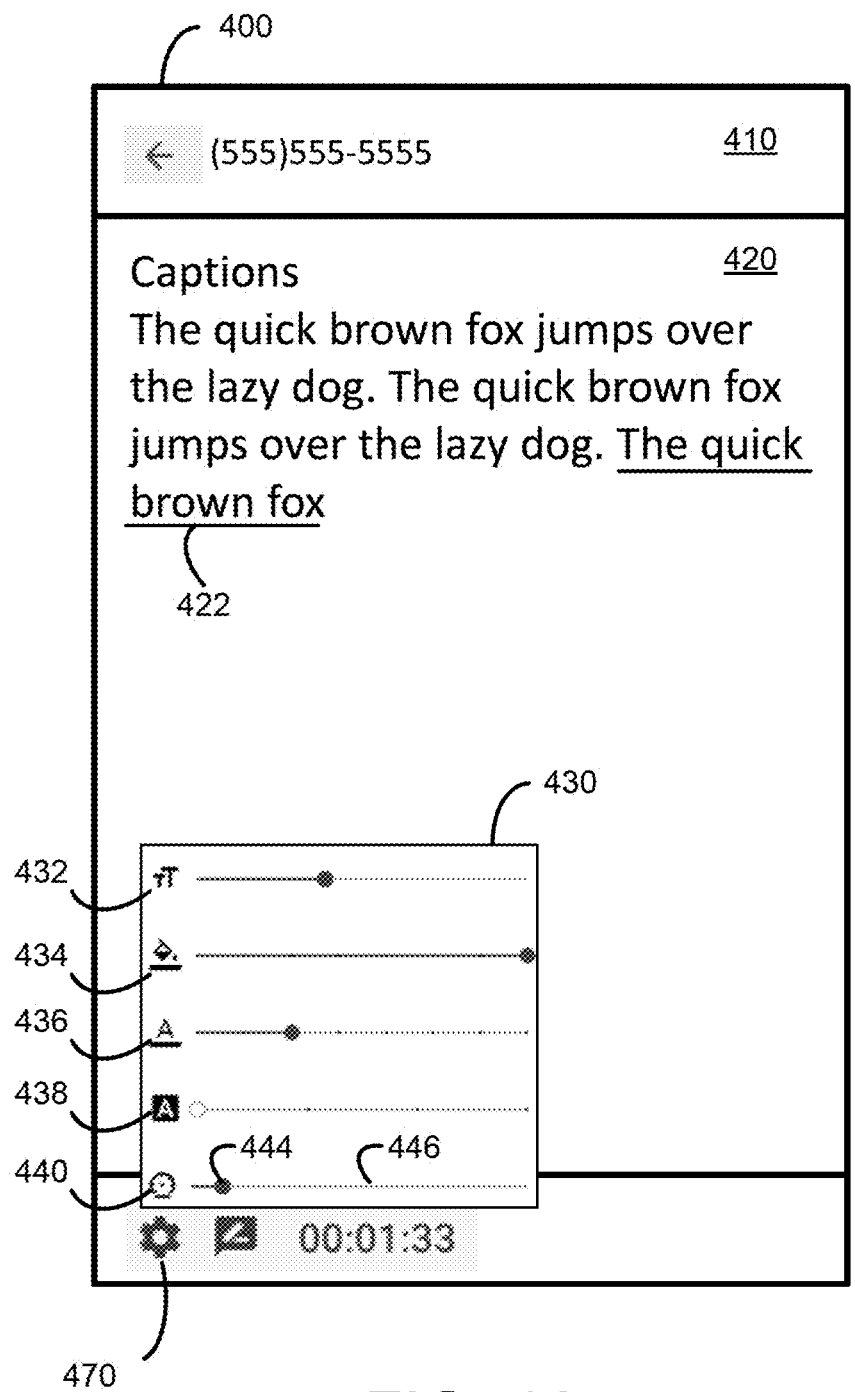
FIGS. 4A through 4C are captions displayed for a first caption rate according to an example embodiment.
Figure 4B:
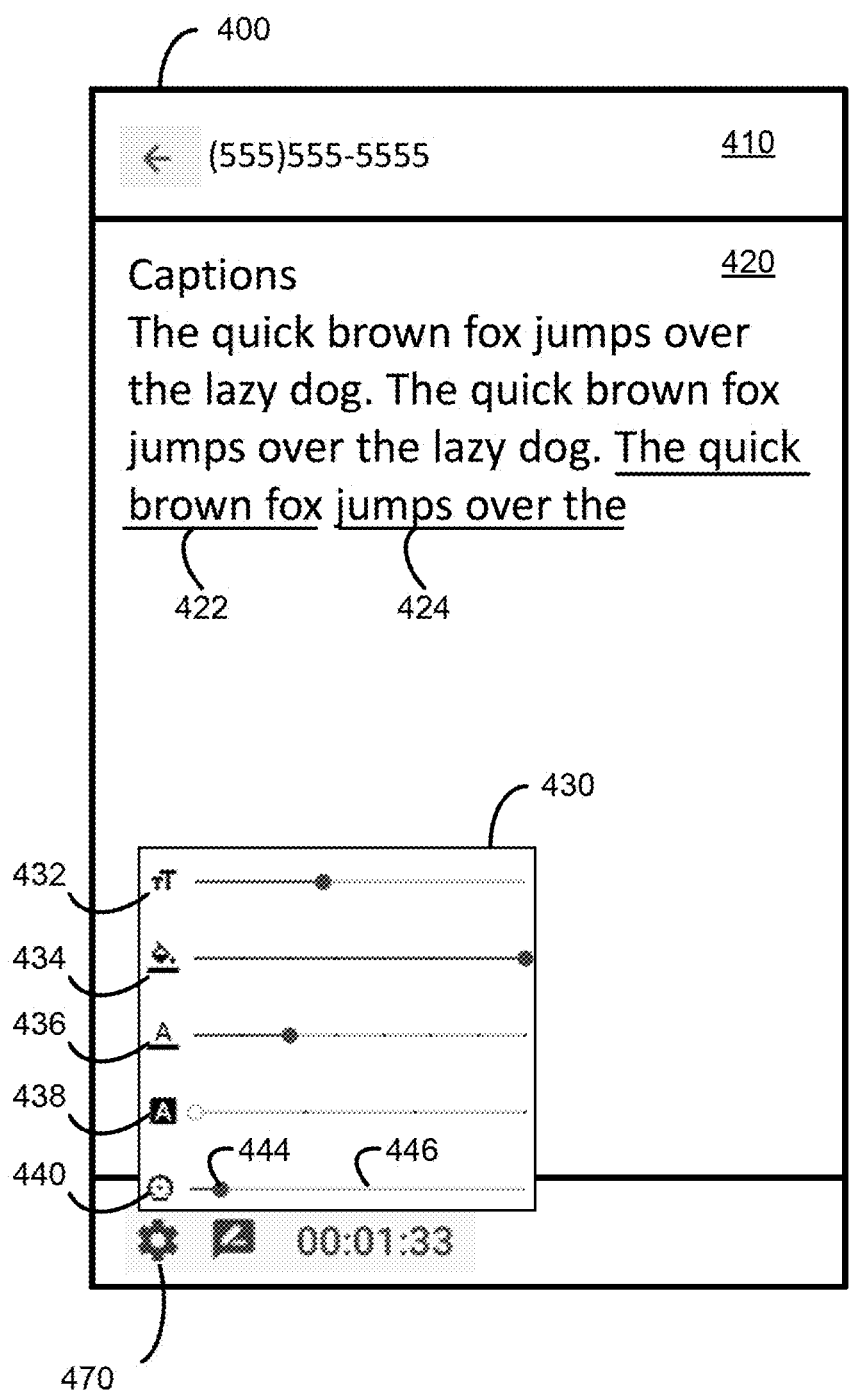
Figure 4C:
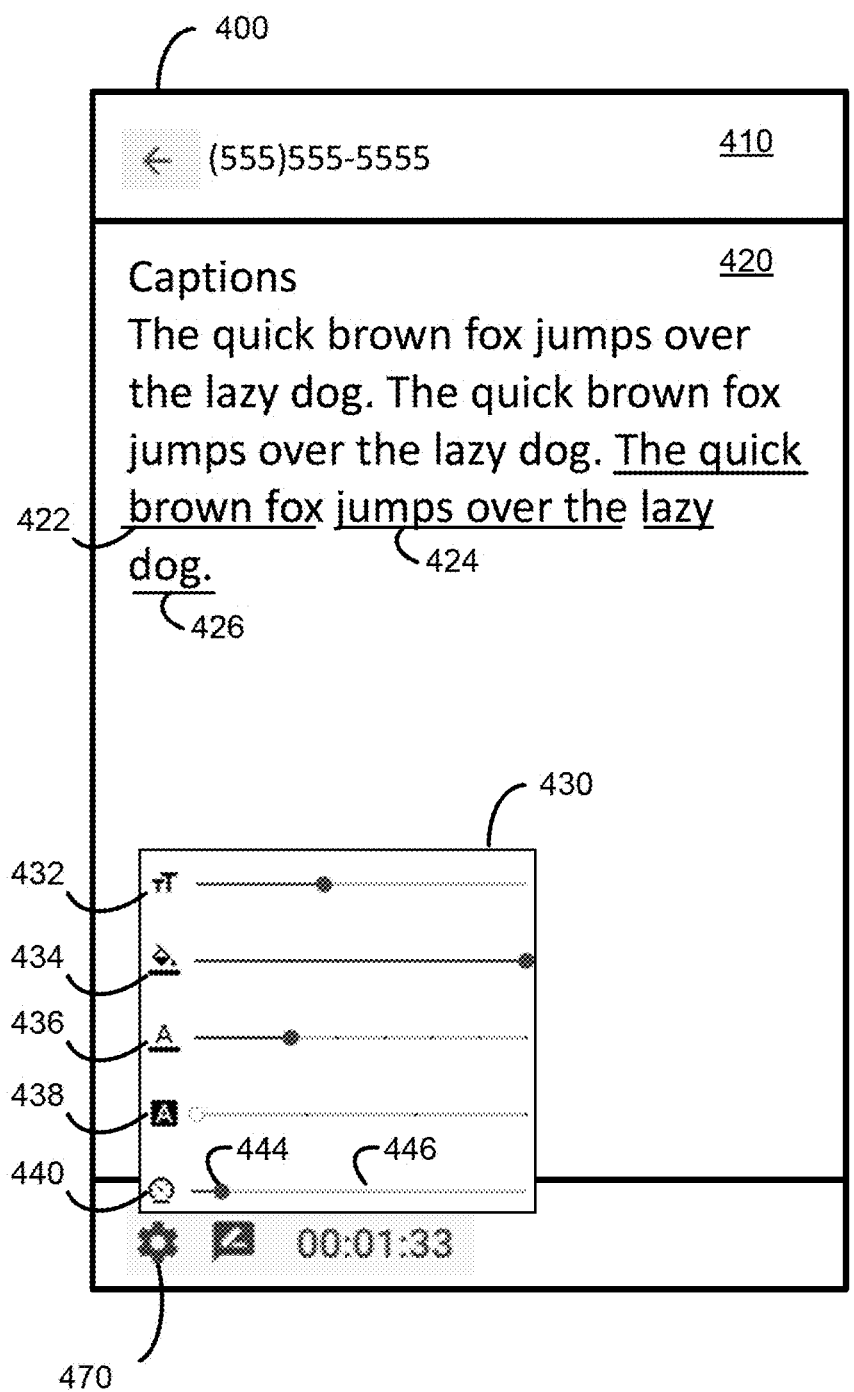

Referring to FIGS. 4A through 4C, illustrated are captions displayed for a first caption rate according to an example embodiment. Referring to FIGS. 5A through 5E, illustrated are captions displayed for a second caption rate according to an example embodiment. In one embodiment, a page 400 is displayed on a smartphone, in response to establishing a live call with another device. In one configuration, the page 400 includes an ID section 410 for indicating a phone number or an identification of a user operating the other device, a caption section 420 for presenting captions, and a caption control interface 430. When the caption control interface 430 is not displayed, a user may press a caption setting button 470 to view the caption control interface 430 on the page 400. The user may press the caption setting button 470 when the caption control interface 430 is displayed to hide the caption control interface 430 from the page 400. The page 400 may be generated by the user interface controller 240 and the caption displayer 260. In other embodiments, the page 400 includes more, fewer, or different components than shown in FIGS. 4A through 4C and FIGS. 5A through 5E.

The ID section 410 is a section of the page 400 to indicate a user of another device to which a call session is established. The ID section 410 may indicate a phone number, name, or identification indicating the user of the other device.

The caption section 420 is a section of the page 400 to display captions. The captions may be displayed according to a live dialogue of the call from the user. In one approach, the caption displayer 260 displays captions according to settings for displaying captions. For example, captions may be displayed according to a font color, a font background color, a caption rate, a character hold time period as specified by the caption control interface 430.

The caption control interface 430 is an interface to allow a user to adjust settings for displaying captions. In some embodiments, the caption control interface 430 includes a text size control interface 432, a caption background color control interface 434, a text color control interface 436, a font control interface 438, and a caption rate control interface 440. These interfaces may be generated by the user interface controller 240. In the example shown in FIGS. 4A through 4C, the interfaces are presented as slider control interfaces to allow easy control of the setting for displaying captions. In one implementation, the caption rate control interface 440 includes a repositionable slider 444 on a track 446, where a position of the slider 444 on the track 446 indicates a corresponding character hold time period. For example, the slider 444 on a left end of the track 446 indicates a lowest character hold time period, and the slider 444 on a right end of the track 446 indicates a highest character hold time period. Alternatively, the slider 444 on the left end of the track 446 indicates the highest character hold time period, and the slider 444 on the right end of the track 446 indicates the lowest character hold time period. Similarly, each of the text size control interface 432, the caption background color control interface 434, the text color control interface 436, the font control interface 438 may be presented as a slider tracker interface, where a position of the slider indicates a corresponding setting for displaying captions (e.g., a size of the text, a background color of the caption, a color of the text, font, etc.).

In the example shown in FIGS. 4A through 4C, blocks of words are displayed according to the slider 444 on the left end of the track 446. According to the position of the slider 444 on the track, characters within a block are presented simultaneously or with a low character hold time period (e.g., less than 10 ms). For example, characters of words in a first block 422 are presented simultaneously or with a low character hold time period in response to a block identifier of the first block 422 as shown in FIG. 4A. Subsequently, characters of words in a second block 424 are presented simultaneously or with a low character hold time period in response to a block identifier of the second block 424 as shown in FIG. 4B. Subsequently, characters of words in a third block 426 are presented simultaneously or with a low character hold time period in response to a block identifier of the third block 426 as shown in FIG. 4C.

Figure 5A:
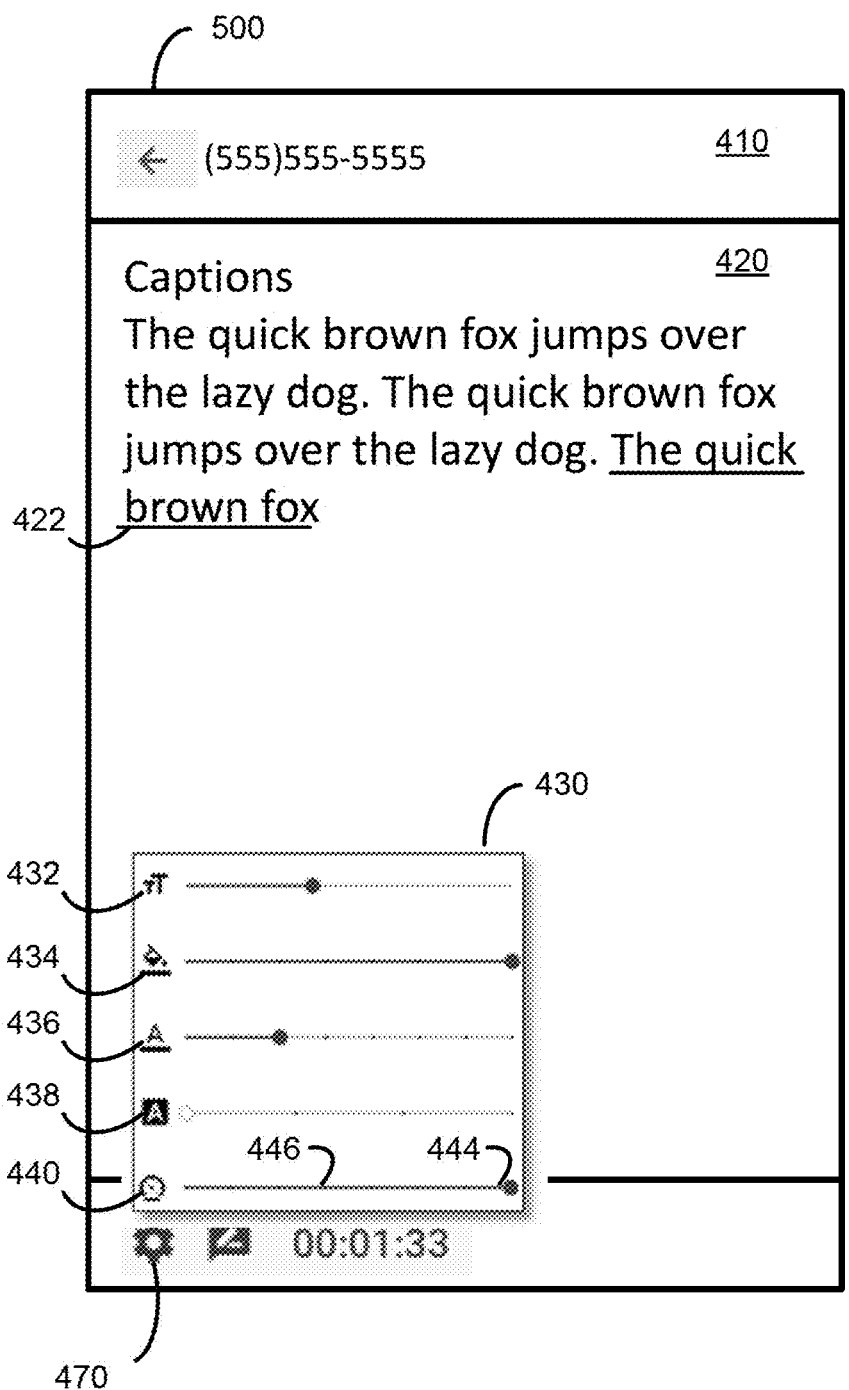
FIGS. 5A through 5E are captions displayed for a second caption rate according to an example embodiment.
Figure 5B:
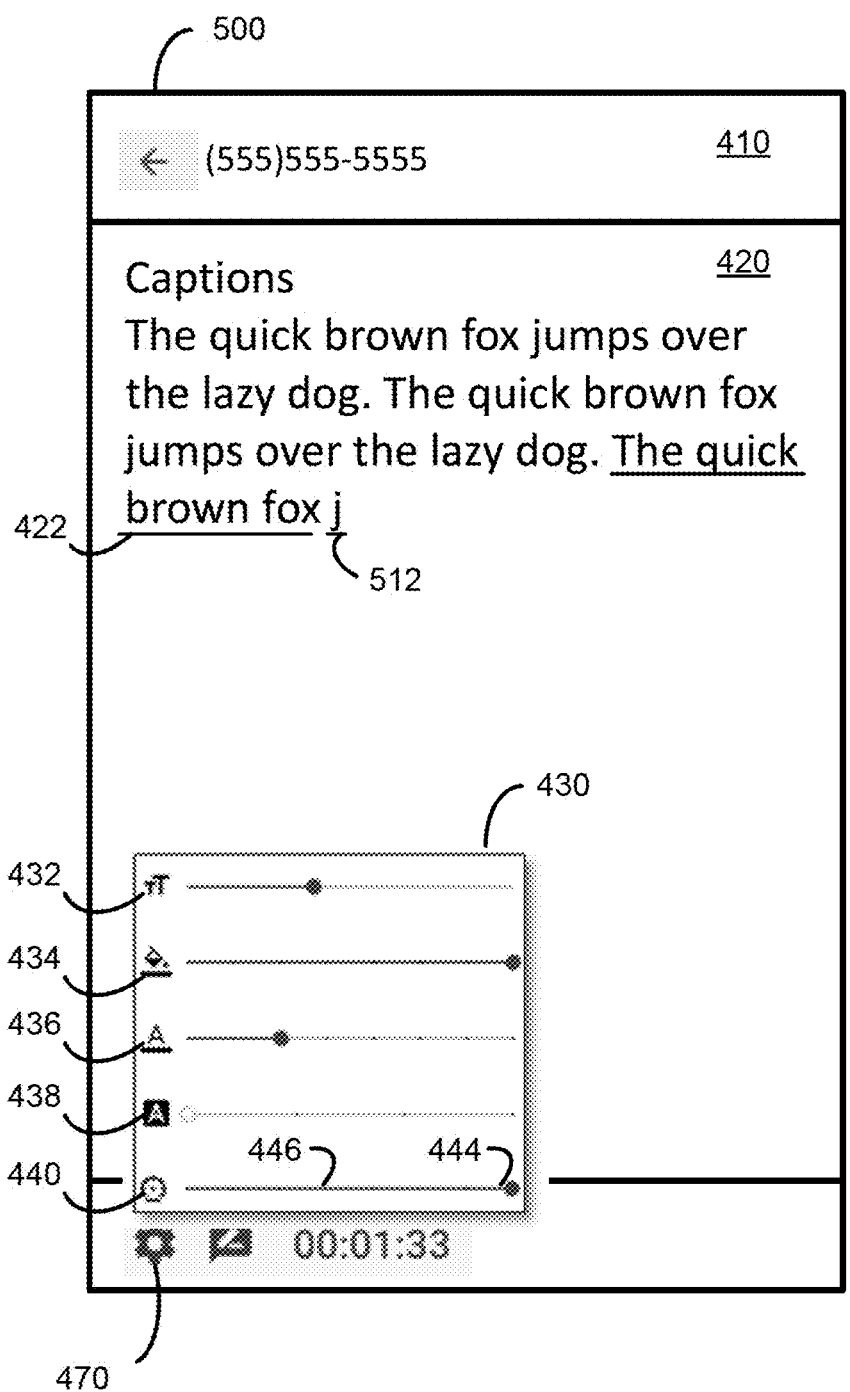
Figure 5C:
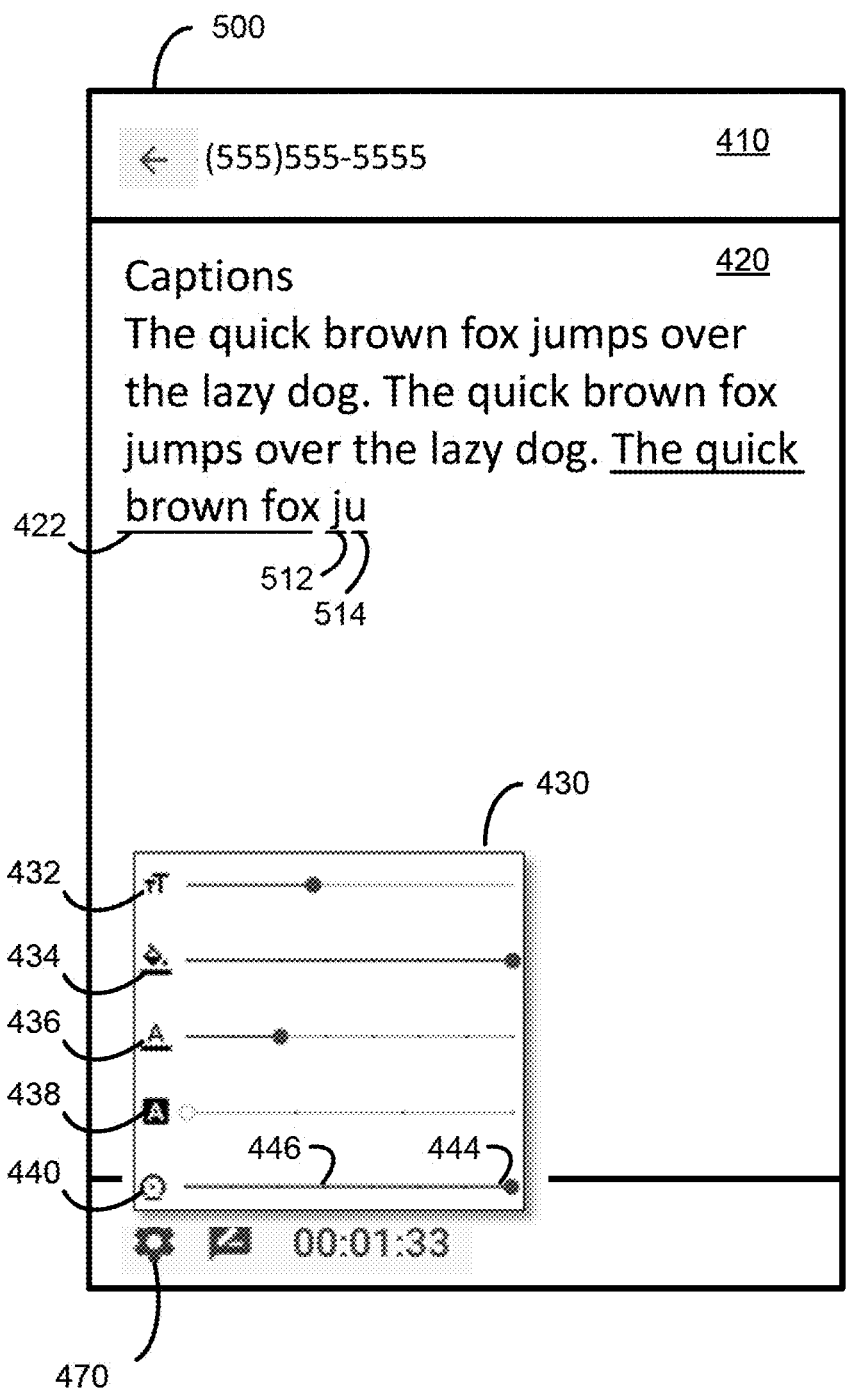
Figure 5D:
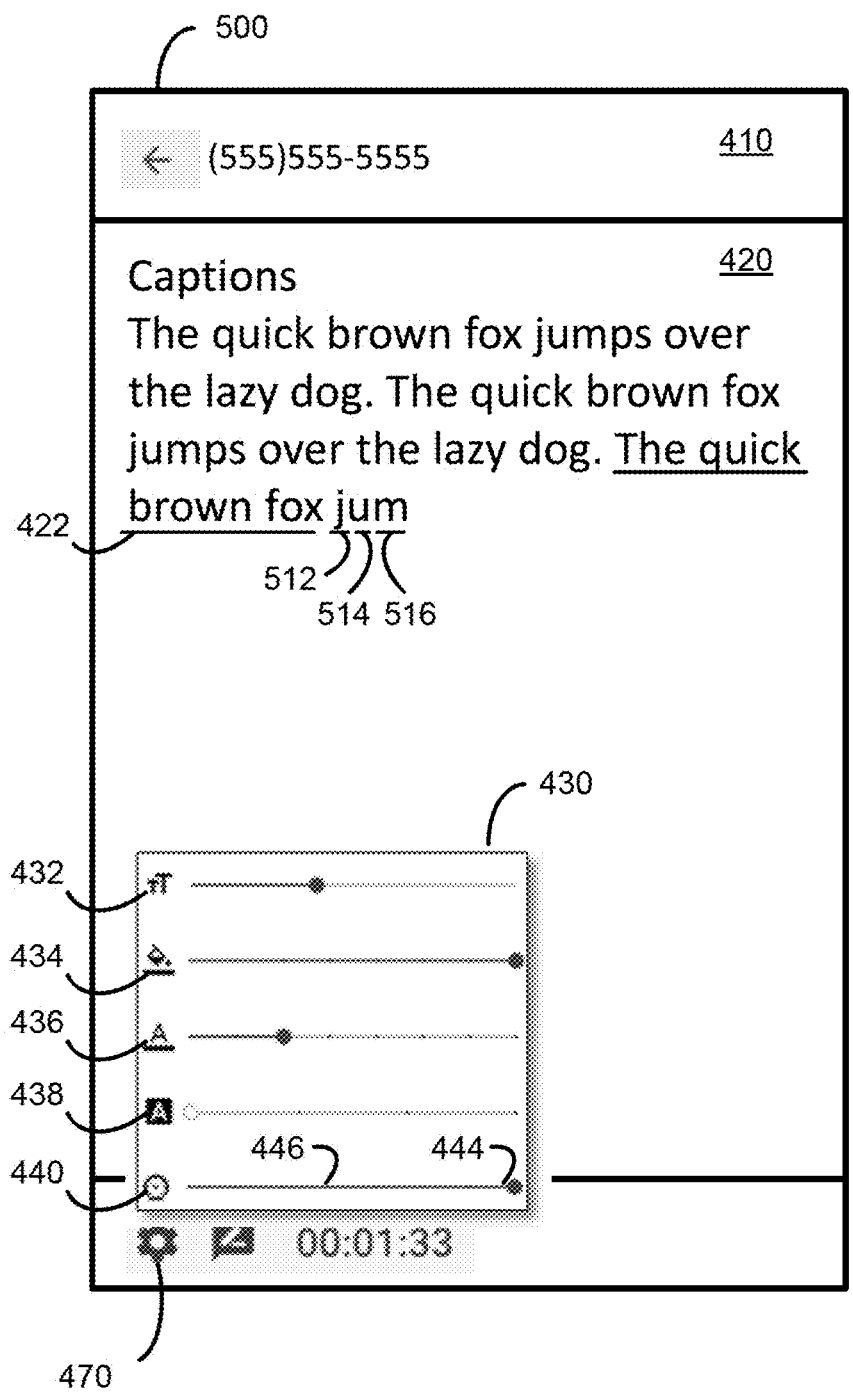
Figure 5E:
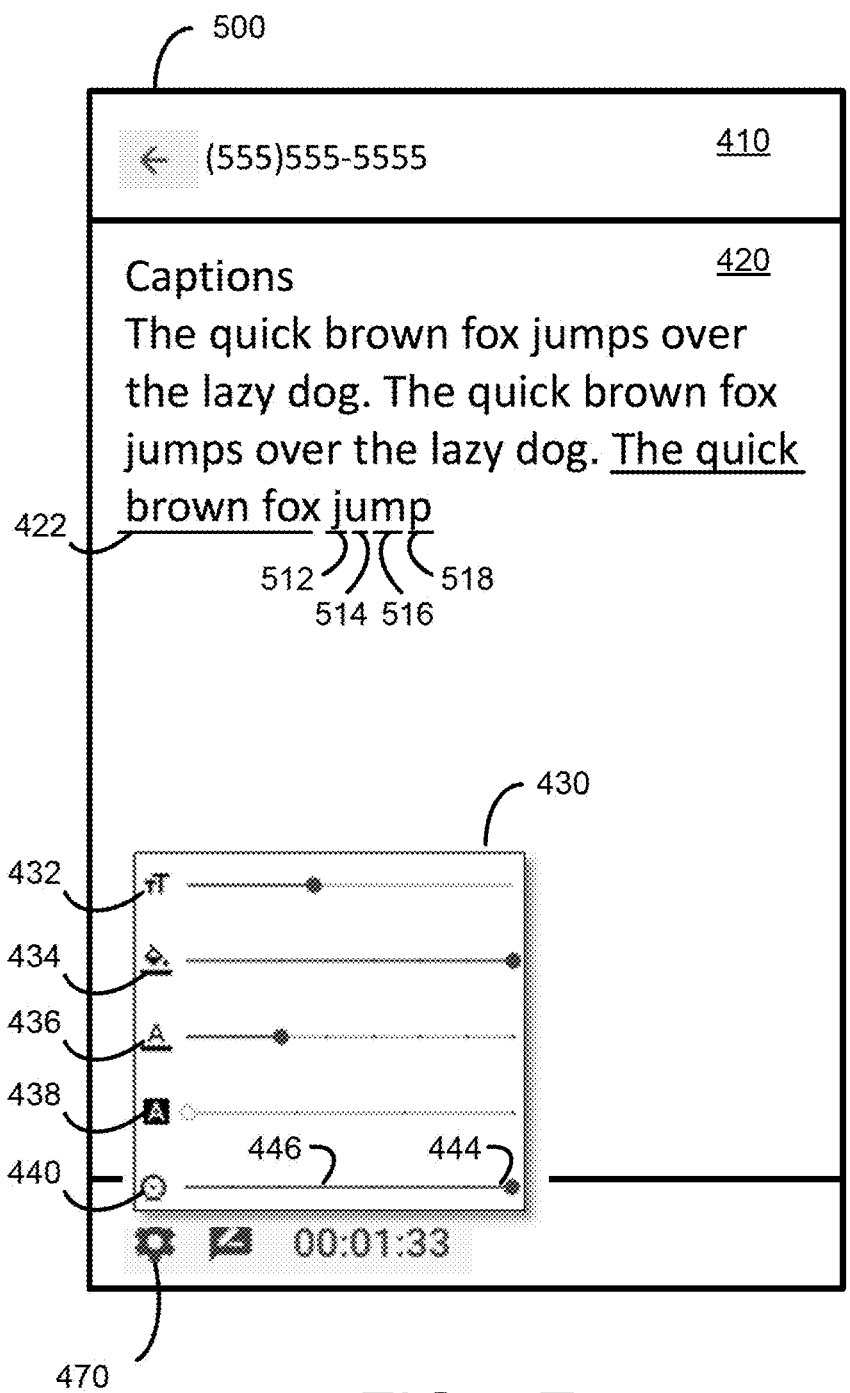

In the example shown in FIGS. 5A through 5E, characters within the block 424 are displayed according to the slider 444 on the right end of the track 446. According to the position of the slider 444 on the track 446, characters within a block are presented with a higher character hold time period (e.g., 100~200 ms) than in FIGS. 4A through 4C. For example, a first character 512 of the block 424 is presented in response to a block identifier of the block 424 as shown in FIG. 5B. Subsequently, a second character 514 of the block 424 is presented as shown in FIG. 5C a character hold time period after presenting the first character 512 of the block 424. Similarly, a third character 516 of the block 424 is presented as shown in FIG. 5D a character hold time period after presenting the second character 514 of the block 424. Similarly, a fourth character 518 of the block 424 is presented as shown in FIG. 5E a character hold time period after presenting the third character 516 of the block 424. After displaying the last character 518 of the second block 424, a first character of the third block 426 may be presented in response to a block identifier of the third block 426.

Figure 6:
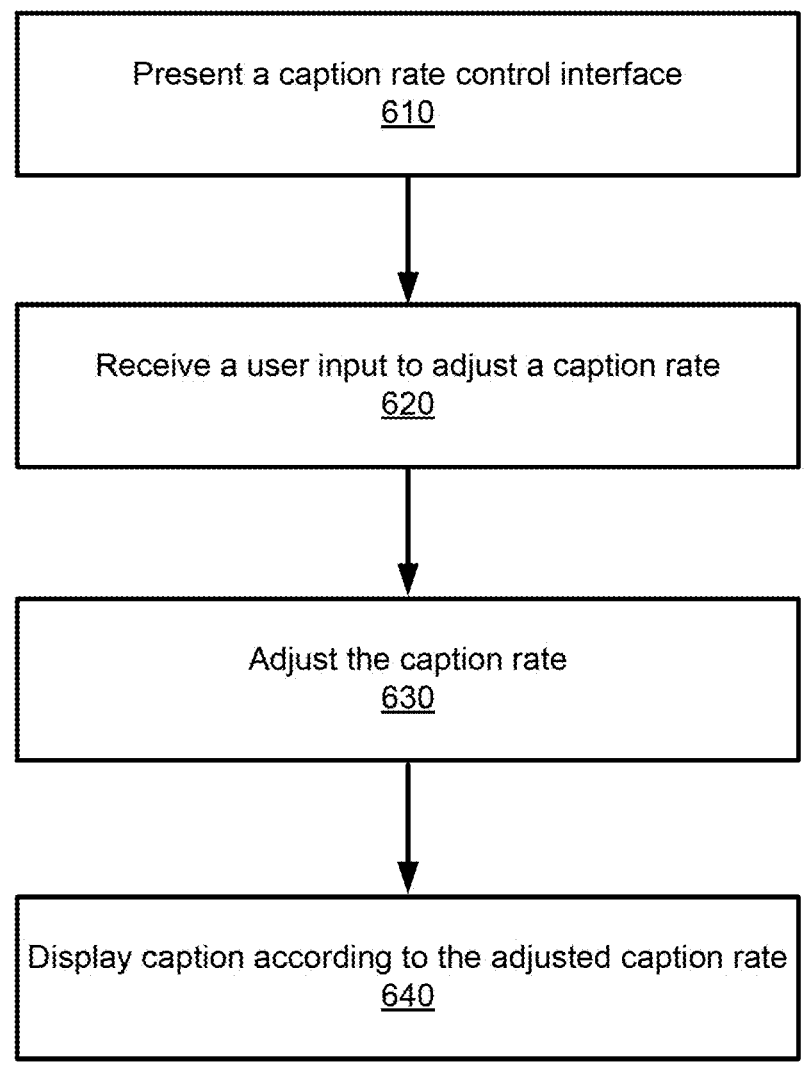
FIG. 6 is a flow chart illustrating a process of presenting captions according to an example embodiment.

Referring to FIG. 6, illustrated is a flow chart showing a process 600 of presenting captions according to an example embodiment. The process 600 may be performed by the device 110. In other embodiments, the process 600 may be performed by other entities. In other embodiments, the process 600 includes more, fewer, or different steps than shown in FIG. 6.

The device 110 presents 610 a caption rate control interface, and receives 620 a user input to adjust a caption rate. The user interface controller 240 may generate a slider control interface with a slider and a track, as shown in FIGS. 4A through 4C and FIGS. 5A through 5E. According to a position of the slider on the track, a caption rate may be adjusted. For example, the slider closer to one end (e.g., left end) of the track indicates a lower character hold time period (or higher caption rate) than the slider closer to another end (e.g., right end) of the track.

According to the user input through the caption rate control interface, the device 110 adjusts 630 the caption rate. For example, the user interface controller 240 determines a corresponding caption rate or a corresponding character hold time period as indicated by the slider control interface, and stores the determined caption rate or the corresponding character hold time as settings for displaying captions at the storage 270.

The device 110 displays 640 captions according to the adjusted caption rate. The caption displayer 260 may obtain settings for displaying captions stored by the storage 270, and causes the display device 220 to display captions according to the settings. In one approach, characters within a block of words are sequentially displayed according to the character hold time period as specified by the settings for displaying captions.

Figure 7:
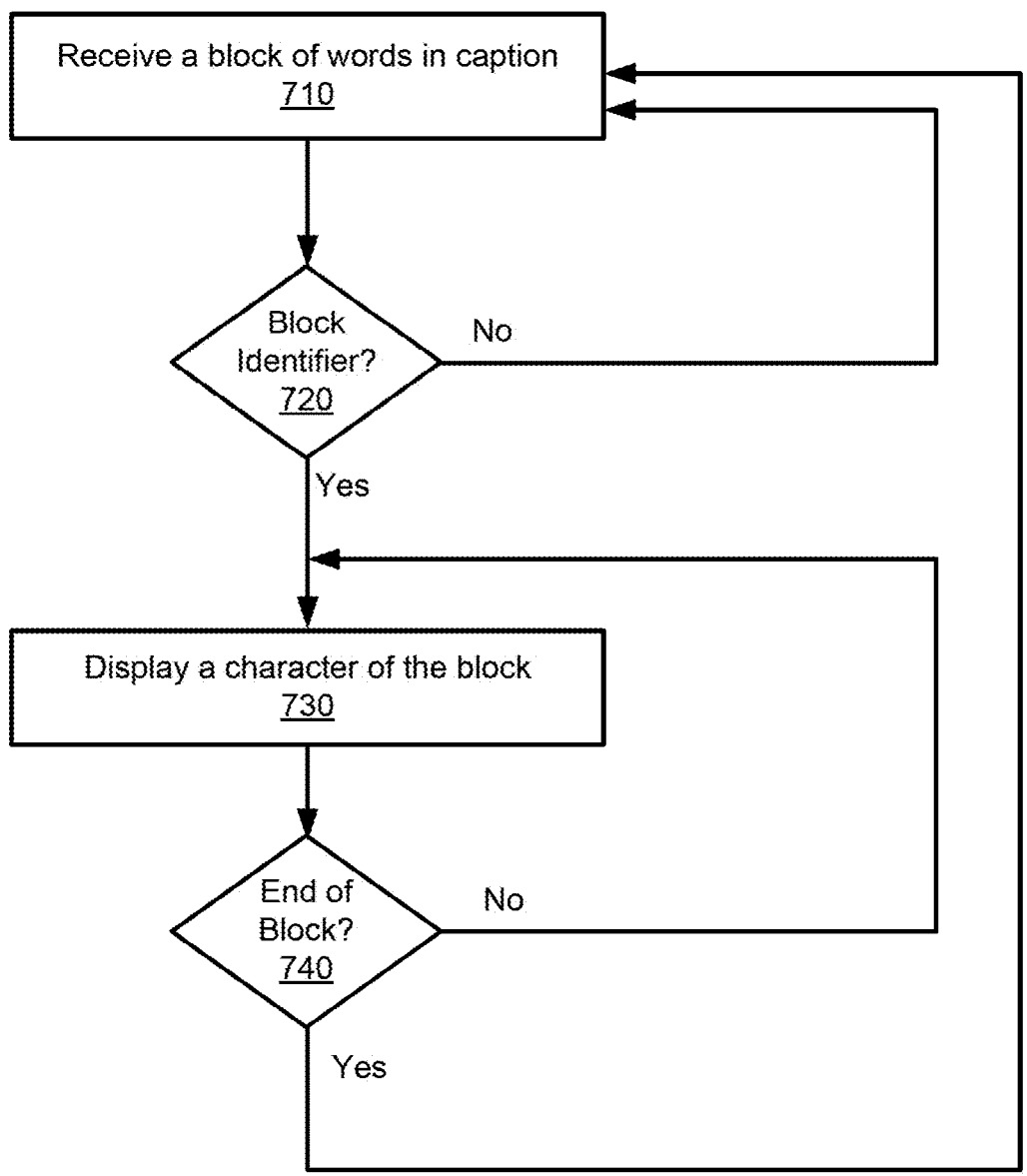
FIG. 7 is a flow chart illustrating a detailed process of presenting captions according to an example embodiment.

Referring to FIG. 7, illustrated is a flow chart showing a detailed process 700 of presenting captions according to an example embodiment. The process 700 may be implemented by the caption displayer 260 of the device 110. In other embodiments, the process 700 may be performed by other entities. In other embodiments, the process 700 includes more, fewer, or different steps than shown in FIG. 7.

The caption displayer 260 receives 710 a block of words. The caption displayer 260 may receive the block of words from the caption data.

The caption displayer 260 determines 720 whether the block of words includes a block identifier. The block identifier may be a character (e.g., "^"). In response to not detecting the block identifier, the caption displayer 260 may return to the step 710 until a block identifier is detected. In response to detecting the block identifier, the caption displayer 260 displays 730 a character of the block. The caption displayer 260 determines 740 whether the end of the block is reached, and sequentially displays characters in the block until the last character of the block is displayed. The caption displayer 260 may display each character in a block other than the first character in the block a character hold time period after presenting a preceding character.

The principles disclosed herein can be applied in any devices for presenting texts. Moreover, the principles disclosed herein may be implemented with any kind of interface. For example, a user interface with a knob, dial, a numeric interface, digital up/down interface, etc. may be presented on a user device to allow a user to adaptively control the caption rate. Advantageously, by allowing a user to control a rate of characters in a block to be displayed, a user may better read or understand texts according to a customized speed or rate. Hence, a readability of reading or communication may improve.

The preceding description is directed to certain implementations for the purposes of describing the innovative aspects of this disclosure. However, a person having ordinary skill in the art will readily recognize that the teachings herein can be applied in a multitude of different ways. The described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, wearable devices, clocks, calculators, television monitors, flat panel displays, electronic reading devices (such as e-readers), computer monitors, auto displays (such as odometer and speedometer displays), cockpit controls and displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, in addition to non-EMS applications), aesthetic structures (such as display of images on a piece of jewelry or clothing) and a variety of EMS devices.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, directional terms are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A non-transitory computer readable medium comprising instructions when executed by a processor cause the processor to:

receive a user input to adjust a caption rate through a caption rate control interface displayed on a display device, wherein the caption rate is a display speed of text captions of dialogue spoken and recognized from an audio accompanying an audio-video stream;

adjust the caption rate according to the user input, wherein the caption rate changes a time interval between characters within a block of words to be displayed, wherein the block of words is associated with a corresponding time of the dialogue;

detect a block identifier in the text captions indicating a start time of the corresponding time of the dialogue in the audio-video stream; and in response to detecting the block identifier, present a first character of the block of words in the audio-video stream and present subsequent characters within the block of words at the adjusted caption rate.

2. The non-transitory computer readable medium of claim 1, wherein the caption rate control interface is a slider control interface.

3. The non-transitory computer readable medium of claim 1, wherein the block identifier is a character in the text captions that is not displayed.

4. The non-transitory computer readable medium of claim 1, further comprising instructions when executed by the processor cause the processor to:

establish a call session with a remote device operated by a remote user;

detect a voice of the remote user; and automatically generate a caption of the detected voice.

5. The non-transitory computer readable medium of claim 4, further comprising instructions when executed by the processor cause the processor to:

segment the text captions of the detected voice into a plurality of blocks of words.

6. The non-transitory computer readable medium of claim 5, wherein the instructions that cause the processor to display the caption further comprise instructions when executed by the processor cause the processor to:

sequentially display the plurality of blocks of words.

7. The non-transitory computer readable medium of claim 6, wherein the text captions electronically represent the dialogue in a text form.

8. The non-transitory computer readable medium of claim 7, wherein the caption rate control interface is a slider control interface comprising a slider and a track, the non-transitory computer readable medium further comprising instructions when executed by the processor cause the processor to:

determine a position of the slider on the track; and determine the caption rate according to the position of the slider on the track.

9. A method comprising:

presenting a caption rate control interface on a touch display device;

receiving a user input to adjust a caption rate through the caption rate control interface, wherein the caption rate is a display speed of text captions of words spoken and recognized from an audio accompanying an audio-video stream;

adjusting the caption rate according to the user input, wherein the caption rate changes a time interval between characters within a block of words to be displayed, wherein the block of words is associated with a corresponding time of the dialogue;

detecting a block identifier in the text captions indicating a start time of the corresponding time of the dialogue in the audio-video stream; and in response to detecting the block identifier, displaying a caption of the block of words in the audio-video stream according to the adjusted caption rate.

10. The method of claim 9, wherein the caption rate control interface is a slider control interface.

11. The method of claim 9, wherein the block identifier is a character in the text captions that is not displayed.

12. The method of claim 9, further comprising:
establishing a call session with a remote device operated by a remote user;
detecting a voice of the remote user; and
automatically generating the caption of the detected voice.

13. The method of claim 9, wherein displaying the caption comprises:
sequentially displaying a plurality of blocks of words.

14. The method of claim 13, wherein the block identifier is a character in the text captions that is not displayed.

15. The method of claim 14, wherein the text captions electronically represents the dialogue in a text form.

16. The method of claim 15, wherein the caption rate control interface is a slider control interface comprising a slider and a track.

17. The method of claim 16, further comprising:
determining a position of the slider on the track,
wherein the caption rate is determined according to the position of the slider on the track.

18. A system comprising:
a processor; and
a non-transitory computer readable medium comprising instructions when executed by the processor cause the processor to:
present a caption rate control interface on a touch display device,
receive a user input to adjust a caption rate through the caption rate control interface, wherein the caption rate is a display speed of text captions of words spoken and recognized from an audio accompanying an audio-video stream,
adjust the caption rate according to the user input, wherein the caption rate changes a time interval between characters within a block of words to be displayed, wherein the block of words is associated with a corresponding time of the dialogue,
detect a block identifier in the text captions indicating a start time of the corresponding time of the dialogue in the audio-video stream, and
in response to detecting the block identifier, display a caption of the block of words in the audio-video stream according to the adjusted caption rate.

19. The system of claim 18, wherein the caption rate control interface is a slider control interface comprising a slider and a track, wherein the non-transitory computer readable medium further comprises instructions when executed by the processor cause the processor to:
determine a position of the slider on the track.

* * * * *